Dec. 3, 1940. C. HUMMEL 2,223,687
PRODUCTION OF EGG-FLOUR PASTE ARTICLES
Filed March 31, 1939
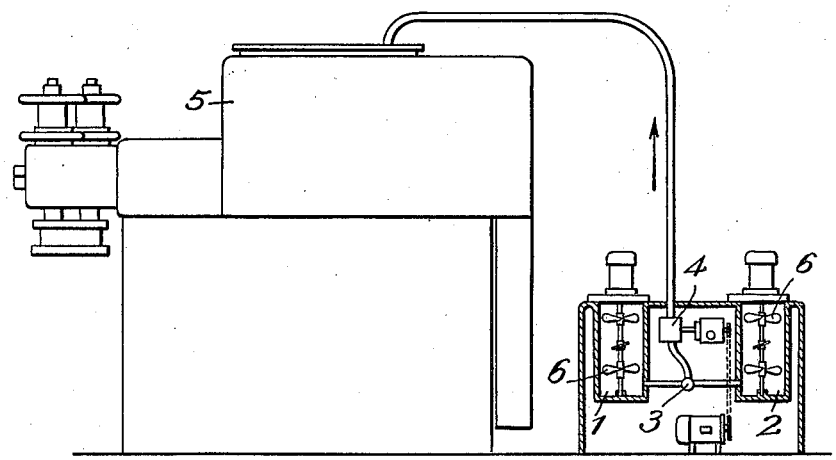
Inventor:
Charles Hummel
By
Sommers + Young attys Patented Dec. 3, 1940

2,223,687

UNITED STATES PATENT OFFICE 2,223,687

PRODUCTION OF EGG-FLOUR PASTE ARTICLES

Charles Hummel, Niederuzwil, Switzerland, assignor to Gebrüder Bühler, Uzwil, Switzerland Application March 31, 1939, Serial No. 265,373
In Germany May 12, 1938

1 Claim. (Cl. 107—54)

This invention relates to a method for the production of egg paste articles in continual operation and by means of the automatically operating and continually delivering presses which have recently been devised for the production of paste articles other than those referred to above.

Hitherto it has been usual to supply grits, water, and the necessary percentage of substance, either as liquid fresh egg material or preserved dry egg material, into the working trough of a mixing machine and to first work these ingredients into a homogeneous mixture. This mixture was then fed to an automatic press for further treatment.

It has also already been proposed, in connection with preserved dry egg material, to mix the latter with the grits and to supply the mixture of grits and egg substance jointly to a continually operating press. This procedure has the drawback of failing if liquid fresh egg material is used and that it is only partly satisfactory if preserved dry egg material is used, since, as experience has shown, the last-named material must be soaked in water prior to being used, for a relatively long time. The wet egg substance irrespective of whether it is obtained from fresh or dry egg material does not homogeneously mix with the grits.

It has further already been proposed, especially in connection with fresh egg material, to feed this material to the press by means of a separate device particularly adapted for this purpose. This procedure is also unsatisfactory for the reason that by this means a perfectly uniform distribution of the egg substance throughout the mass of the working material is not obtained for the reason stated above.

Most satisfactory results are obtained only if, as provided by means of the method according to this invention, the amount of egg substance used is mixed with more than half of the total amount of water required, and then the mixture of water and egg substance is supplied to the press in predetermined quantities. Due to the egg substance being mixed with such an amount of water this mixture is non-viscous and devoid of colloidal strand formations, such as has been experienced in using preserved dry or liquid fresh egg material respectively. The volume of this mixture can therefore be readily measured and dosed by means of gauged nozzles or measuring pumps without the mixture obstructing the nozzles or the pumps even if only relatively small doses are required to be used at a time.

The device for carrying the method according to the invention into effect is distinguished by one or more mixing containers for the production of the egg-water mixture, a stirring device arranged for operation within the container for maintaining the structure of the mixture uniform throughout, a measuring device, operating, for example, by means of a control pump, control nozzle, or the like, for supplying the mixture to the press in predetermined measured quantities, and a device for feeding grits separately to the press.

An embodiment of the device for carrying the method according to the invention into effect is schematically illustrated in the accompanying drawing.

The numerals 1, 2 each designate one of two relatively large containers which are connected with a pump 4 via a three-way valve 3. This pump which can be driven at variable speed supplies to the press 5 an accurately dosed quantity of liquid. The mixing containers 1, 2 are each provided with a suitable stirring device 6 by means of which the structure of the mixture can be maintained uniform throughout. The press 5 is of the fully automatically operating kind which is adapted to compress egg-paste saturated with water to the degree of saturation required by the egg-paste ingredients fed thereto, that is, egg substance mixed with an amount of water greater than half the total amount necessary for producing the egg paste, on the one hand, and grits on the other hand. The latter material is fed to the press by a separate feed device of any suitable kind (not shown).

Advantageously, the egg-water mixture is first prepared in one of the containers by mixing the amount of egg substance to be used, which substance may have been obtained from fresh or dry egg material, with the afore-mentioned amount of water. When this mixture has become uniform throughout, the pump is started. While this container is emptied a new supply of mixture may be prepared in the other container. After the first container is completely emptied the pump is changed over to the second container by means of the three-way valve, and a new supply of mixture is prepared in the first container, and so forth. By this means homogeneous egg-water mixture is continually fed to the press in predetermined volumetric quantities, and through the separate feed device grits are continually fed to the press in quantities proportionate to the feed of egg substance and are soaked, in the press, with the egg-water and, if necessary, with an additional amount of water supplied to the press by means not shown. The paste thus produced is homogeneously mixed with egg substance, due to the particles of the grits being brought together with proportionate amounts of water intimately mixed with the requisite amount of egg substance, the latter penetrating into the grits as these are soaked in the egg-water mixture. The compressed egg-paste articles are delivered by the press 5 in continuity with the feeds of mixture and grits to the press through the delivery head thereof.

Various changes and modifications may be made in the practice of my invention without departing from the principle or spirit thereof, by adding customary practice and established knowledge of the art to the present disclosure and the scope of the appended claim is not to be regarded as limited except as specified therein.

What I claim is:

The method of producing egg-paste articles, comprising mixing a quantity of egg substance with more than one-half of the total amount of water required in the paste to form a homogeneous non-viscous mixture devoid of colloidal strand formations and having a fluidity permitting the volume of said mixture to be readily measured, continually feeding said mixture to a zone of compression in predetermined measured volumetric quantities, separately feeding grits to said compression zone in quantities proportionate to said feed of egg substance, soaking said grits at said zone by means of said mixture to the degree of water saturation required by said quantities of egg substance and grits fed thereto, for obtaining a homogeneously mixed egg-paste, and compressing said egg-paste at said zone into egg-paste articles.

CHARLES HUMMEL.